(No Model.)  5 Sheets—Sheet 1.
R. C. SAYER.
RAILWAY.
No. 581,773.  Patented May 4, 1897.
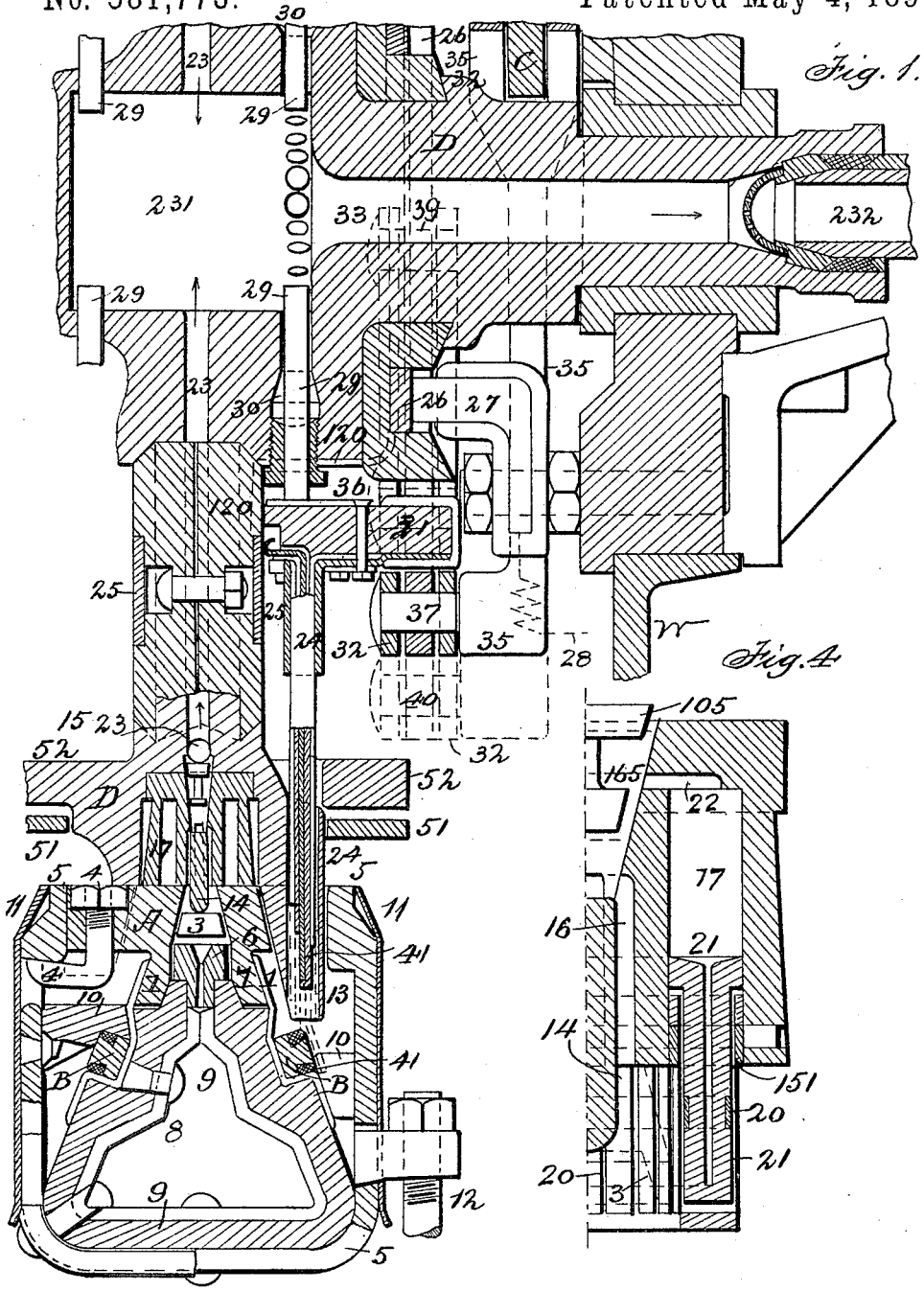
WITNESSES
Franck L. Ourand
H. K. Boulter
INVENTOR
Robert Cooke Sayer.
By Wm E. Boulter,
assoc. Attorney (No Model.) 5 Sheets—Sheet 2.
R. C. SAYER.
RAILWAY.
No. 581,773. Patented May 4, 1897.
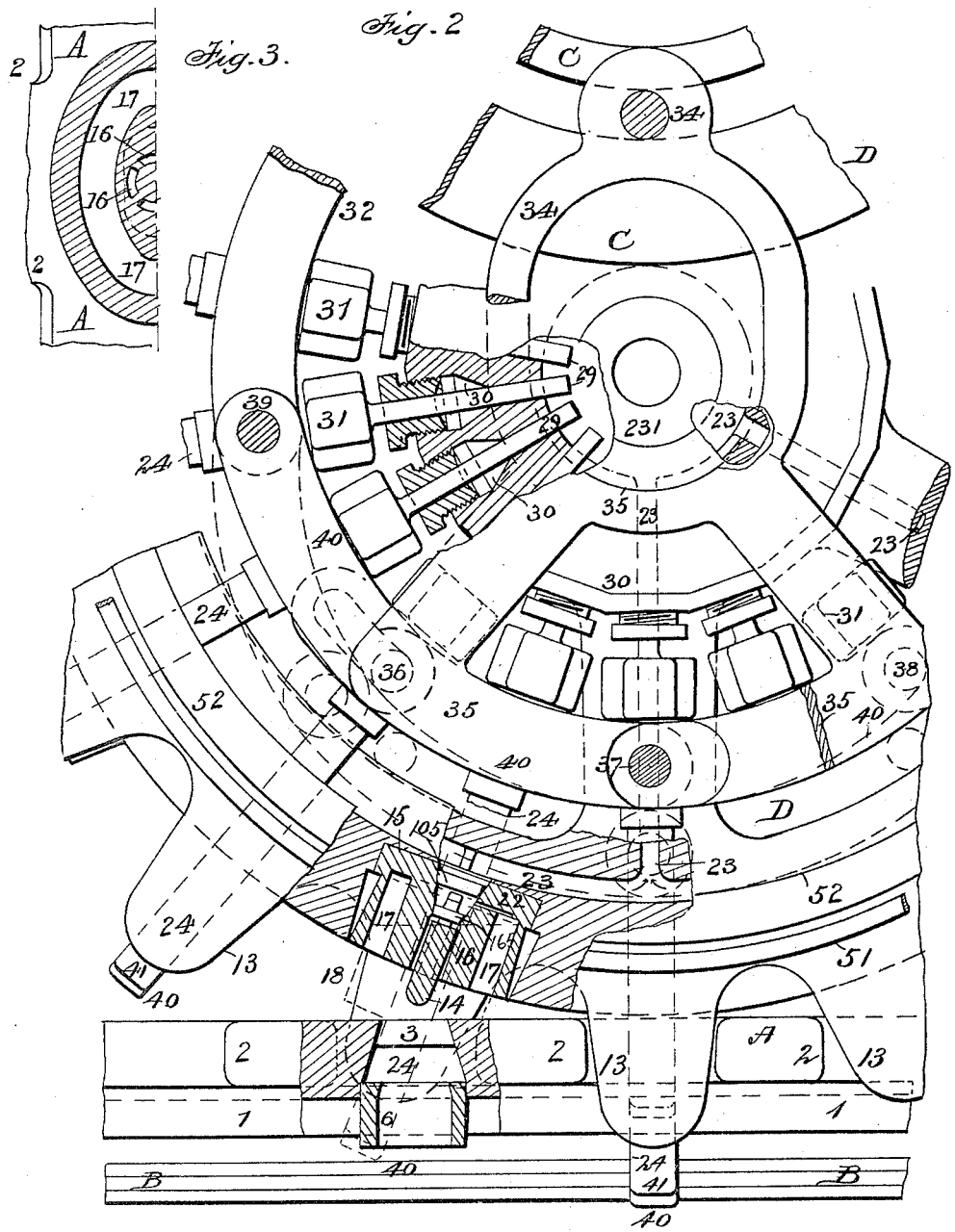
Witnesses
Franck L. Ourand
H. K. Boulter
Inventor
Robert Cooke Sayer.
By Wm E Boulter
assoc. Attorney (No Model.) 5 Sheets—Sheet 3.

R. C. SAYER.
RAILWAY.

No. 581,773. Patented May 4, 1897.

Witnesses
Franck L. Ourand
H. K. Boulter

Inventor
Robert Cooke Sayer.
By Wm E. Boulter
Assoc. Attorney (No Model.)  R. C. SAYER.  5 Sheets—Sheet 4.
RAILWAY.

No. 581,773.  Patented May 4, 1897.

Witnesses
Franck L. Ourand.
H. K. Boulter

Inventor
Robert Cooke Sayer.
By Wm. O. Boulter,
Assoc. Attorney

THE NORRIS PETERS CO., PHOTO-LITHO., WASHINGTON, D. C.

(No Model.) 5 Sheets—Sheet 5.

R. C. SAYER.
RAILWAY.

No. 581,773. Patented May 4, 1897.

Witnesses.
Franck L. Ourand.
H. K. Boulter.

Inventor
Robert Cooke Sayer.
By Wm. E. Boulter, Attorney

UNITED STATES PATENT OFFICE.

ROBERT COOKE SAYER, OF BRISTOL, ENGLAND.

RAILWAY.

SPECIFICATION forming part of Letters Patent No. 581,773, dated May 4, 1897.

Application filed April 3, 1896. Serial No. 586,102. (No model.)

*To all whom it may concern:*

Be it known that I, ROBERT COOKE SAYER, a subject of the Queen of Great Britain and Ireland, residing at Redland, Bristol, in the county of Gloucester, England, have invented certain new and useful Improvements in Railways; and I do hereby declare the following to be a full, clear, and exact description of the invention, such as will enable others skilled in the art to which it appertains to make and use the same.

This invention for improvements in or connected with railways has for its object to convey power to a car or body on a line of rails from a stationary source.

In carrying out this invention air or other pressure is transmitted from a stationary generator to a line of pipes carrying insulated electric conductors and provided with openings closed by automatic valves. Radial tubes mounted on the car-wheels and provided with automatic valves cover, as the wheels rotate, said openings, and projections open at the same time the pipe, automatic valves admitting the air-pressure to the radial tubes, from which it passes to a chamber and thence to a pipe running down the car. Brushes mounted to slide radially on the car-wheel are automatically forced outwardly by the air-pressure, so that projections bear against a ring having adjustable hinged portions that can be raised or lowered at pleasure, so that when lowered the brushes are forced out sufficiently to make contact with the conductors on the pipe.

Figure 5:
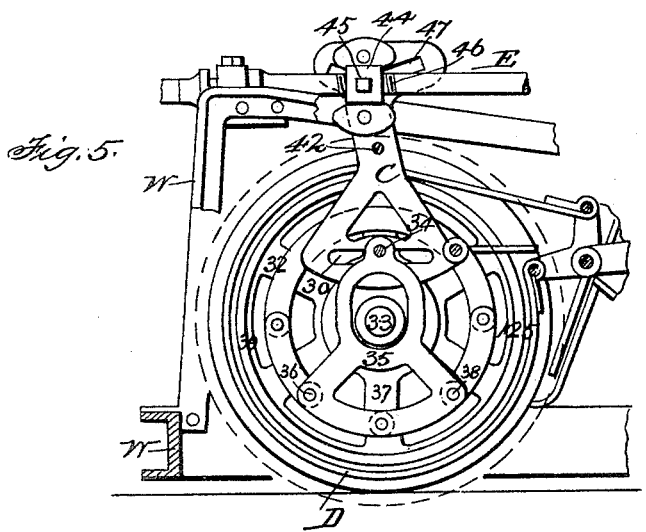
Figure 5A:
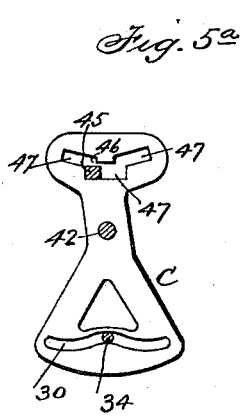
Figure 8:
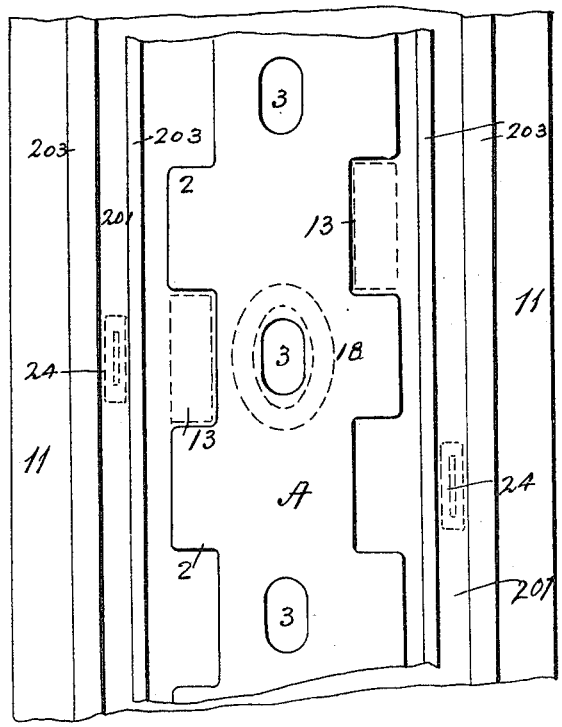
Figure 7:
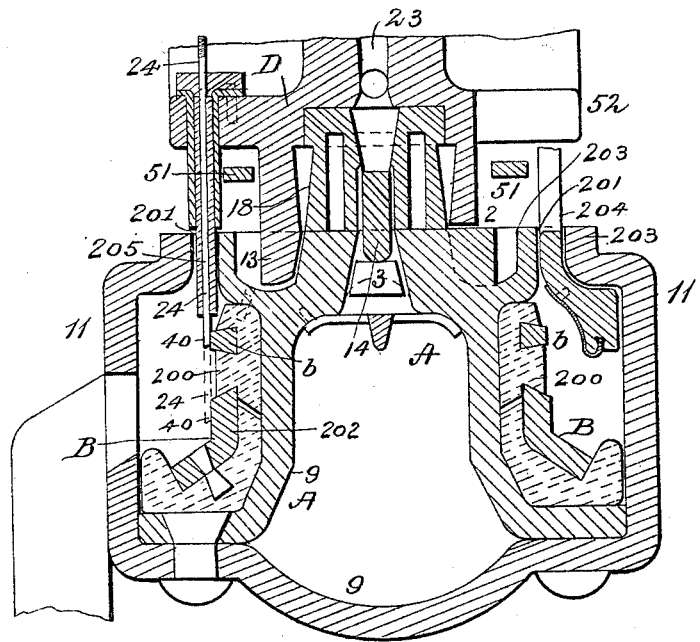
Figure 6:
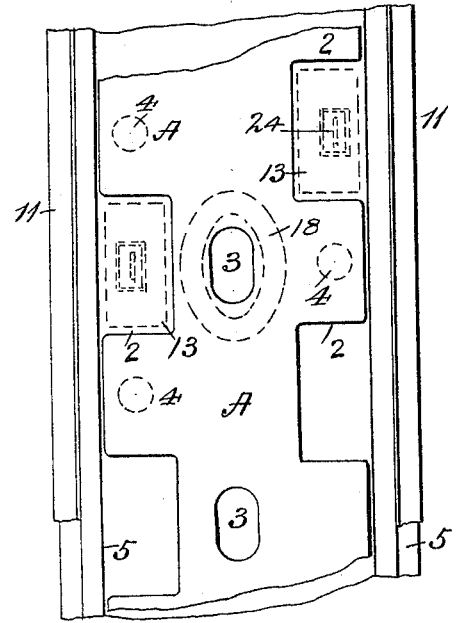
Figure 9:
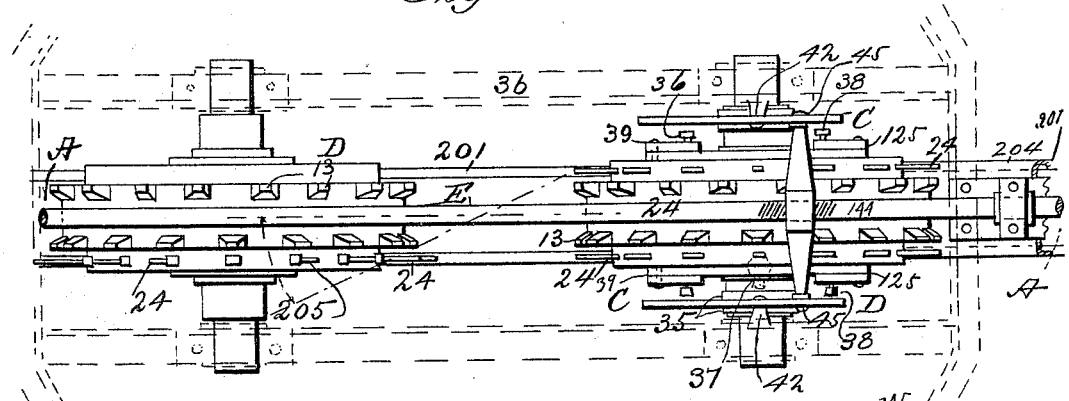
Figure 10:
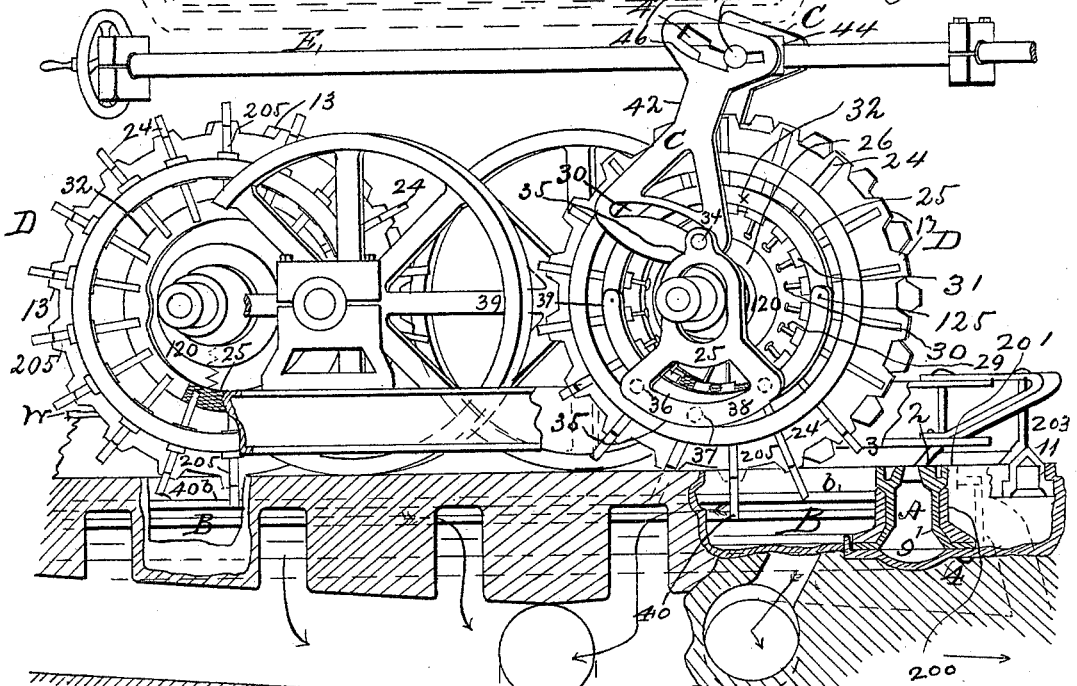

In the accompanying sheets of illustrative drawings, Figure 1 is a transverse section through a portion of the main wheel of the car and the rail on which it runs. Fig. 2 is a longitudinal section of the same. Figs. 3 and 4 are detail views. Fig. 5 is a side elevation of the main wheel to a reduced scale, and Fig. 5ᵃ is a detail view. Fig. 6 is a plan of the rail, showing the relative position of the radial tubes and of the radial brushes. Figs. 7 and 8 show a slightly-modified construction. Figs. 9 and 10 are a plan and a perspective view, respectively, of the apparatus.

A rail-head A, having flanges 1, teeth 2, and holes closed by valves 3, is held down by the bolts 4 and straps 5 to the tube 9, the upper parts of which are thrust against distance-pieces 6 and made tight at 7 to retain compressed air. The head A and tube 9 break joint and are secured by fish-plates 8 and straps 5. The rail-head A and tubes 9 are formed in one with welded joints when the traffic requires it.

The insulated conductors B, carried by the tube 9, being held in place at 10, convey the main electric current from the generating-stations. Side plates 11 form channels that are drained and held down by bolts 12 to its foundations.

The main wheels D of the car are kept in position both laterally and circumferentially by beveled teeth 13 on the wheel engaging with the teeth 2 of the rail A. The wheels carry equally-spaced flush-blocks 15. Each block 15 is formed with a pin 14, apertures 16, that lead through non-return valves 105 and 165, and an annular recess 17, in which is placed the elastic cushion 18, recessed at 21, Fig. 4, and bound together by the vertical and horizontal bands 20, so as to allow a sufficient play.

The air is compressed at fixed stations and carried in the tube 9. The cushions 18 are normally projected by the air admitted to the chamber 22 against their stops 151. They press on the rail A and give a tight passage for the air from the tube 9. When the pin 14 opens the rail-valve 3, the air passes through the tight passage and past the small valves 165 and 105. The air-pressure also passes to the chamber 22 between the valves to fully compress the cushion 18 against the rail A and to passages 23 and chamber 231. From the chamber 231 the pressure is conveyed through a swivel-joint 232 to where required. The wheels D also carry the insulated radial electric conductors 24, which pass through the teeth 13 and make contact with the conductors B and with the ring 25, itself connected by the conductor 120, ring 26, and brush 27 to the conductor 28. The radial arms or conductors 24 have lugs 31, that take against the fixed ring 32 and are prolonged at 29 to pass through stuffingboxes 30 to the chamber 231, where they are forced out by the air, so that the lugs 31 bear against the ring 32.

The lower part of the ring 32 is formed of separate parts jointed together and to the ring at 39, 36, 37, 38, and 125, the joints 36 and 38 being also sliding joints. The jointed parts are raised and lowered by the joint-pins 36, 37, and 38, which are carried in a stirrup 35, that is raised or lowered by means of the pin 34 of a slotted lever C. On lowering the jointed parts the radial arms or conductors 24 are successively forced outward as they pass these parts to the position 41, Fig. 2, to make contact with the conductors B and pick up the electric current, and are then withdrawn. When desired to always keep a set of radial arms or conductors 24 in contact with the conductors B, a plain ring 32 only is required. The upper contact between the radial arms or conductors 24 and ring 25, Fig. 1, is not effected until the lower contacts at 40 are below the exposed rail A and under cover of the insulations 200 and 205, and as they rise before leaving 200 their upper contacts leave the ring 25 and prevent short-circuiting. The electric current returns to the generating-stations through the wheels D and rail-tubes A.

The lever C centers on the frame W at 42 and is actuated by traversing the nut 44 by rotating a shaft E in either direction. The trunnions 45 of the nut act upon the part 46 of the cam-slot of the lever C to thrust it over, and when they reach the part 47 they hold it in position, during which the continued rotation of the shaft does not further actuate the lever C. The lever is provided at its lower end with a double-curved slot 30, in which works the pin 34, attached to the stirrup 35, the curvature being such that the pin 34 is lowered whether the lever C is moved to the left or right.

When the division of the electric current carried by the two conductors B does not give sufficient power without endangering street-traffic, the number of the conductors is increased, as shown at B b in Fig. 7, at each side of the rail A and are supplied at the generating-station by division of the main current. The conductors B b are insulated from each other, as shown at 200, and have a bare face 202.

The conductors B carry proportionate parts of the main current, so that light cars having their radial arms or conductors 24 of limited length can be arranged to pick up the small part of the whole current carried by one or both of the conductors, while others with longer radial arms or conductors 24 take more and others the whole.

When the aggregate width of the conductors with their insulation 200 is so great that the radial arms or conductors 24 would knock against the teeth 13, the arrangement shown in Figs. 7 and 8 is adopted. The rail is formed on either side with a continuous groove 201, formed between flanges 203 and outside the teeth.

What I claim is—

1. The means for conveying power from a stationary generator to a car running on rails, consisting of power-conveyers on the rail, radial connectors on the wheel adapted as the wheel rotates on the rail to connect with the power-conveyers on the rail, teeth on the rail-head and corresponding teeth on the wheel to keep the wheel in position laterally and circumferentially.

2. The means for conveying power from a stationary generator to a car consisting of a hollow air-tight rail, teeth on the rail-head, automatic valves in the rail-head, car-wheels running on the said rails, teeth on the car-wheels corresponding to the teeth on the rail-head to keep the wheel in position laterally and circumferentially so as to register with the valves, radial tubes on the wheel adapted to come over the rail-valves, automatic valves in the said tubes, a packing or cushion carried by the wheel and adapted to make a tight joint between the rail-head and the radial tubes, and projections on the wheels to open the rail-valves.

3. The means for conveying power from a stationary generator to a car, consisting of a hollow air-tight rail, divided electric conductors at different heights on the rail, car-wheels running on the rail, radial air-tubes in the wheels adapted to receive the air from the hollow rail, sliding radial arms or conductors on the wheel adapted to be forced out by the air-pressure, a means for adjusting the distance the radial arms are forced out as the wheel rotates, brushes carried by the rails and adapted to make contact when forced out with the conductors on the rail, teeth on the rails and corresponding teeth on the wheels to keep the wheels in position laterally and circumferentially.

In testimony whereof I have affixed my signature in presence of two witnesses.

ROBERT COOKE SAYER.

Witnesses:
 W. HARTE CLARKE,
 WILLIAM S. CLARKE.